United States Patent [19]

Kubota et al.

[11] 4,250,467
[45] Feb. 10, 1981

[54] GAS LASER

[75] Inventors: Shigeo Kubota, Tokyo; Asao Kurousu; Shozaburo Hayakawa, both of Kawasaki, all of Japan

[73] Assignee: Sony Corporation, Tokyo, Japan

[21] Appl. No.: 957,747

[22] Filed: Nov. 6, 1978

[30] Foreign Application Priority Data

Nov. 9, 1977 [JP] Japan .............................. 52/134292

[51] Int. Cl.³ .............................................. H01S 3/03
[52] U.S. Cl. .......................... 331/94.5 D; 331/94.5 PE
[58] Field of Search .................... 331/94.5 D, 94.5 G, 331/94.5 PE, 94.5 C

[56] References Cited

U.S. PATENT DOCUMENTS

| 3,916,337 | 10/1975 | Kindl et al. | 331/94.5 D |
| 3,976,956 | 8/1976 | Longsderff et al. | 331/94.5 C |
| 4,064,466 | 12/1977 | Seki et al. | 331/94.5 G |

Primary Examiner—William L. Sikes
Attorney, Agent, or Firm—Hill, Van Santen, Steadman, Chiara & Simpson

[57] ABSTRACT

A gas laser is disclosed, in which one end surface of a plasma tube of a gas laser envelope is worked to be perpendicular to the axis of the plasma tube, a cap covers a mirror and the end surface of the plasma tube so as to make the mirror abut against the worked end surface, the cap is fixed at its open end to the plasma tube by frit material, and a bore is formed through the plasma tube which is covered by the cap.

3 Claims, 4 Drawing Figures

GAS LASER

BACKGROUND OF THE INVENTION

1. Field of the Invention

The present invention relates generally to a gas laser, for example, He-Ne laser, and is directed more particularly to a gas laser in which a mirror is directly abutted to the end surface of a plasma tube.

2. Description of the Prior Art

In a prior art gas laser, as shown in FIG. 1, there is provided an envelope 1 formed of a cylindrical glass tube. A plasma tube 2, which consists of a pair of glass bore tubes or glass capillary tubes 2a and 2b, is located on the central axis of the envelope 1. Within the envelope 1 and around the plasma tube 2, there is disposed a cylindrical electrode 3 which will serve as one of the electrodes, for example, a cathode, and a terminal 4 is led out from the cylindrical electrode 3 outside the envelope 1. A mirror 5 is attached to the outer end of the glass bore tube 2a of the plasma tube 2 outside the envelope 1, and a Brewster window 6, for example, is attached to an outer end of the other glass tube 2b outside the envelope 1. Another electrode, for example, anode 7 is provided in connection with the glass bore tube 2a such that the anode 7 passes through the glass bore tube 2a into the inside thereof at the outside of the envelope 1.

With the above prior art gas laser, it is necessary that the mirror 5 have the mirror surface perpendicular to the axis of the plasma tube 2. Accordingly, the mirror 5 is attached to the glass bore tube 2a of the plasma tube 2 in such a manner that the mirror surface of the mirror 5 abuts against an outer end surface 8 of the glass bore tube 2a which surface 8 is worked perpendicular to the axis of the plasma tube 2 or glass bore tube 2a and that, for example, glass frit material 9 is used to seal up the connecting portions of the mirror 5 and the glass bore tube 2a of the plasma tube 2.

When the glass frit 9 is used to seal up as set forth just above, a crack is generated in the vicinity of the sealed portion. The reason for this is that stress is applied to the connected portions by the frit, due to the difference between the thermal expansion coefficients of the mirror 5 and the glass bore tube 2a. That is, in general, a multilayer dielectric film 10 is coated on the inner or mirror surface of the mirror 5, so that the mirror 5 is selected sufficiently great in its thickness as to prevent it from being curved upon the coating of the film 10. An optical glass having relatively high thermal expansion coefficient is used as the material of the mirror 5. As a result, the thermal expansion coefficient of the mirror 5 is much different from that of the plasma tube 2. Further, a distortion is caused on the end surface 8 of the glass bore tube 2a upon its working, the frit glass 9 is positioned near the multilayer dielectric film 10 on the inner surface of the mirror 5 and the end surface 8 of the tube 2a, and so on, so that a crack is apt to be caused at the connecting portion of the plasma tube 2 consisting of the glass bore tubes with the mirror 5 upon sealing the connecting portion by the frit glass 9. Further, there is a defect in that the dielectric film 10 is broken.

Therefore, it may be considered that the sealing of the mirror 5 to the plasma tube 2 is achieved with an organic adhesive agent such as epoxy resin or the like. The organic adhesive agent, however, lacks thermal stability, so that upon evacuating the gas laser, the heating for baking can not be performed sufficiently. Further, since the organic adhesive agent itself produces gas, the gas laser can not be maintained at a constant pressure for a long period of time and cannot maintain the purity of the gas with the result that its shelf life or stack life is shortened.

In order to avoid the above defect, an improved structure is herein disclosed. As shown in FIG. 2, a junction metal tube 11 made of, for example, Kovar (Tradename) is glazed to the outer end of the plasma tube 2, and a deformable tube body 13 having a flange 12 made of, for example, nickel is connected to the outer end of the junction metal tube 11, and a metal tube 14 having a dish-shape end made of, for example, Fe-Ni-Cr alloy is attached to the outer end of the tube body 13, and the mirror 5 with the dielectric film 10 is sealed in the dish-shaped metal tube 14 by the frit glass 9. In this case, the respective thermal expansion coefficients of the metal tubes 11, 13 and 14 are sealed such that the thermal expansion coefficients become successively near to that of the glass of the mirror 5 from that of the glass of the plasma tube 2. The axis alignment of the mirror 5 with the plasma tube 2 is performed by gripping the flange 12 of the metal tube 13 and deforming the same. Accordingly, in this case, it requires that much skillfulness and time are necessary to achieve the alignment of the mirror 5 and the accuracy thereof is relatively low.

SUMMARY OF THE INVENTION

Accordingly, it is an object of the present invention to provide a novel gas laser.

It is another object of the invention to provide a gas laser free from all the defects encountered in the prior art gas laser.

It is a further object of the invention to provide a gas laser high in mechanical accuracy.

It is a still further object of the invention to provide a gas laser long in lifetime span.

It is a yet further object of the invention to provide a gas laser which can be easily made.

According to an aspect of the present invention, there is provided a gas laser which comprises an envelope, a plasma tube located in the envelope, one end surface of the plasma tube being worked perpendicular to the axis of the plasma tube, a cap which covers an end portion of the plasma tube in such a manner that a mirror is held to abut against the worked end surface of the plasma tube, the cap being fixed at its open end to the plasma tube by frit material, and a bore formed through a portion of the plasma tube which is covered by the cap.

The other objects, features and advantages of the invention will become apparent from the following description taken in conjunction with the accompanying drawings through which the like reference numerals designate the same elements.

DESCRIPTION OF THE PREFERRED EMBODIMENTS

The present invention will be hereinafter described with reference to the drawings.

Figure 1:
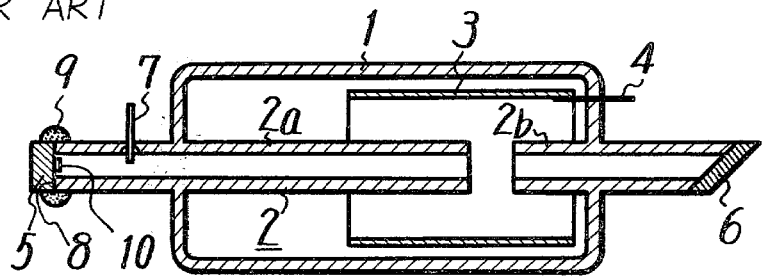
FIG. 1 is a cross-sectional view showing an example of the prior art gas laser.
Figure 2:
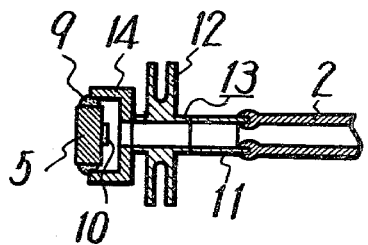
FIG. 2 is a cross-sectional view showing the main part of another prior art gas laser.
Figure 3:
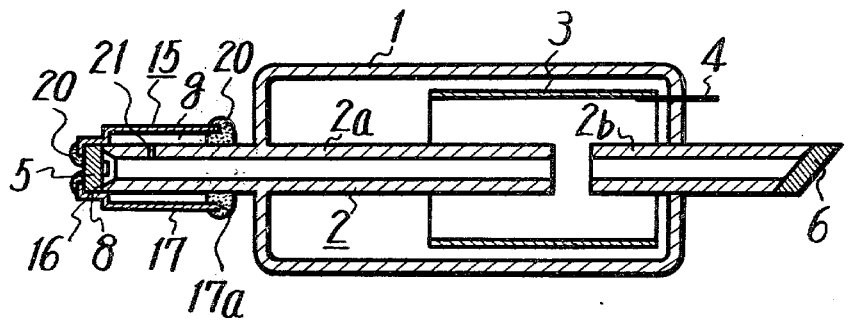
FIG. 3 is a cross-sectional view showing an example of the gas laser according to the present invention.

FIG. 3 shows in cross-section an example of the gas laser according to the present invention in which the parts corresponding to those of FIG. 1 are marked with the same reference numerals and their detailed description will be omitted.

In the example of the invention shown in FIG. 3, the outer surface 8 of the plasma tube 2 is also worked to be substantially perpendicular to the axis of the plasma tube 2, and the inner or mirror surface of the mirror 5 is abutted on this inner surface 8. In the invention, specially a metal cap 15 is used to cover the mirror 5 and the outer end portion of the plasma tube 2, i.e., its glass bore tube 2a so as to keep the inner surface of the mirror 5 in abutment position against the outer end surface 8 of the plasma tube 2.

Figure 4:
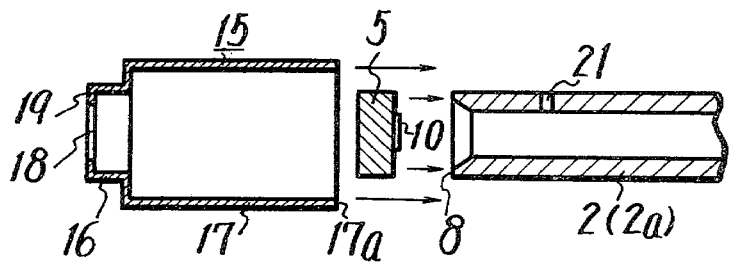
FIG. 4 is an exploded cross-sectional view of the main part of the gas laser of the invention shown in FIG. 3.

As shown in FIG. 4, the metal cap 15 consists of a cylindrical portion 16, which has the inner configuration corresponding to the outer configuration of the mirror 5, and another cylindrical portion 17 which has the inner diameter greater than that of the first cylindrical portion 16. An end plate 19 having, for example, a central aperture 18 is provided on the outer end of the cylindrical portion 16. It is desired that the inner configuration of the cylindrical portion 17 be selected greater than the outer configuration of the plasma tube 2, and hence when the metal cap 15 covers the mirror 5 and the outer end portion of the plasma tube 2, a gap g is formed between the cylindrical portion 17 and the plasma tube 2. Further, the length of the second cylindrical portion 17 in the axial direction is selected such that its open end 17a is apart from the end surface 8 of the plasma tube 2 under the state that the cap 15 covers the plasma tube 2. When the cap 15 covers the end portion of the plasma tube 2 and the mirror 5, the end plate 19 is fixed to the mirror 5 by frit glass material 20 through the central aperture 18 of the end plate 19 and the open end 17a of the cap 15 is also fixed to the plasma tube 2 by frit glass material 20 to mechanically attach the cap 15 to the end portion of the plasma tube 2 and the mirror 5 in air-tight manner. In this case, it is also possible that the mirror 5 be preliminarily inserted into the cap 15 and then fixed thereto by frit glass. Further, it is not always necessary to provide the central aperture 18 through the end plate 19, but it is possible that frit material be provided on the inner surface of the end plate 19 with no aperture, by which material the mirror 5 is fixed to the inner surface of the end plate 19. Through a part of the plasma tube 2 which is covered by the cap 15 there is provided a bore 21 which is communicated to the gap g between the plasma tube 2 and the cap 15.

According to the gas laser of the invention with the above construction, since the mirror 5 is so located that it abuts against the end surface 8 of the plasma tube 2 which is worked to be perpendicular to the axis of the plasma tube 2, the mirror surface of the mirror 5 is kept accurately perpendicular to the axis of the plasma tube 2, and is mechanically supported by the cap 15 at this state, and the inside of the cap 15 is positively prevented from being communicated to the open air by the frits 20. In this case, since the frit 20 is located apart from the end surface 8 of the plasma tube 2, the stress based on the difference between the thermal expansion coefficients of the materials of the plasma tube 2 and mirror 5 upon the frit-baking is avoided to be directly applied to the end surface 8 and the multilayer dielectric film 10 coated on the inner surface of the mirror 5 where the residual strain exists. Therefore, the crack caused thereby can be prevented. Further, since the mirror 5 abuts against the end surface 8 of the plasma tube 2 by means of the cap 15, the difference between the thermal expansion coefficients of the materials forming the tube 2 and the mirror 5 can be reduced as compared with the case where the tube 2 and mirror 5 are directly fixed to each other by the frit and also the stress can be absorbed by the metal cap 15. Thus, the generation of cracks can be avoided.

Further, since in the invention the bore 21 is formed through the part of the plasma tube 2 which is covered by the cap 15, the air existing in the gap g between the tube 2 and the cap 15, a portion of which gas may be produced from the baked frit 20, can be exhausted out through, for example, the bore 21 and tube 2 to the outside of the envelope 1 by means of an exhaust pipe (not shown) which may be attached to the envelope 1 with no residual gas.

Also, the inside of the plasma tube 2 is communicated with the gap g through the bore 21, the cap 15 itself can be used as one of the electrodes, for example, the anode, so that a discharge space is established between the metal cap 15 and the other electrode or cathode 3 through the plasma tube 2 and bore 21 and hence discharge is produced in the discharge space. Accordingly, with the present invention, there is no need to insert an electrode 7 into the plasma tube 2 of a small diameter as in the prior art example shown in FIG. 1, so that the gas laser can be manufactured easily and high in reliability.

As described above, according to the present invention, the gas laser, which is high in mechanical accuracy, can be easily provided and is prevented from being of insufficient gas exhaust due to employment of the organic adhesive agent and shortened in lifetime span as in the prior art.

Although the above description is given on a single preferred embodiment of the invention, it will be apparent that many modifications and variations could be easily effected by one skilled in the art without departing from the spirit or scope of the novel concepts of the present invention, so that the spirit or scope of the invention should be determined by the appended claims.

We claim as our invention:

1. In a discharge structure for a gas laser, a gas laser tube comprising an envelope, a plasma tube located in said envelope and having a portion thereof extending outside of said envelope, a mirror secured to the end of said tube perpendicular to the axis of said tube, a metal cap having a first cylindrical portion in which said mirror is nested, and a second cylindrical portion of greater diameter than said first cylindrical portion extending over the outer portion of said plasma tube but being of greater internal diameter than said tube leaving a gap between said second cylindrical portion and said plasma tube, means sealing said cap to said plasma tube to form a sealed gap therebetween, said tube having an aperture therethrough communicating said gap with the interior of said plasma tube.

2. In a discharge structure for a gas laser, a gas laser tube comprising an envelope, a plasma tube located in said envelope, one end portion of said plasma tube extending out through a wall of said plasma tube being worked perpendicular to the axis of said plasma tube, a cap covering said end portion of said plasma tube, a mirror mounted in said cap and held to abut against said worked end surface of said plasma tube, said cap being fixed at its open end to said one end portion of said plasma tube, the open end of said cap being sealed to said end portion of said plasma tube to provide a closed annular space around said one end portion of said plasma tube, and a bore through said one end portion of said plasma tube to communicate said closed annular space with said plasma tube.

3. A discharge structure according to claim 4 in which said cap is made of metal and serves as an electrode for discharge in said gas laser.

* * * * *